US011776329B2

(12) United States Patent
Kraus

(10) Patent No.: US 11,776,329 B2
(45) Date of Patent: Oct. 3, 2023

(54) SOUND ANALYSIS TO IDENTIFY A DAMAGED COMPONENT IN A WORK MACHINE

(71) Applicant: DEERE & COMPANY, Moline, IL (US)

(72) Inventor: Timothy J. Kraus, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 482 days.

(21) Appl. No.: 17/020,926

(22) Filed: Sep. 15, 2020

(65) Prior Publication Data
US 2022/0084333 A1 Mar. 17, 2022

(51) Int. Cl.
| | |
|---|---|
| *G07C 5/08* | (2006.01) |
| *A01B 76/00* | (2006.01) |
| *B60Q 9/00* | (2006.01) |
| *G01M 99/00* | (2011.01) |

(Continued)

(52) U.S. Cl.
CPC ............ *G07C 5/0808* (2013.01); *A01B 76/00* (2013.01); *B60Q 9/00* (2013.01); *G01M 99/005* (2013.01); *G01N 29/4427* (2013.01); *G07C 5/0825* (2013.01); *A01F 15/08* (2013.01)

(58) Field of Classification Search
CPC .... G07C 5/0808; G07C 5/0825; A01B 76/00; B60Q 9/00; G01M 99/005; G01N 29/4427; G01N 3/56; A01F 15/08; A01F 15/00
See application file for complete search history.

(56) References Cited

U.S. PATENT DOCUMENTS

| | | |
|---|---|---|
| 6,146,268 A | 11/2000 | Behnke et al. |
| 6,622,468 B2 | 9/2003 | Lucand et al. |
| 6,640,699 B2 | 11/2003 | Viaud |

(Continued)

FOREIGN PATENT DOCUMENTS

| | | | |
|---|---|---|---|
| CN | 110386530 A | * | 10/2019 |
| DE | 10100444 A1 | | 7/2002 |

(Continued)

OTHER PUBLICATIONS

CN-110386530-A machine translation (Year: 2019).*

(Continued)

*Primary Examiner* — Frederick M Brushaber
(74) *Attorney, Agent, or Firm* — Taft Stettinius & Hollister LLP; Stephen F. Rost

(57) ABSTRACT

An agricultural work machine, an agricultural work machine control system, and method for an agricultural work machine having a sound sensor configured to transmit sound signals generated by the work machine during operation. The transmitted sound signals are received by a controller and used to determine if the work machine is operating properly. The controller compares an operating frequency profile, based on the transmitted sound signals, to a baseline frequency profile, to determine whether a likelihood of a malfunctioning or damaged part or system of the work machine is present. If so, the controller transmits a signal to either turn off the agricultural work machine or transmits an alert to a display indicating that a malfunctioning or damaged part or system has been identified.

20 Claims, 4 Drawing Sheets

(51) Int. Cl.
    *G01N 29/44*    (2006.01)
    *A01F 15/08*    (2006.01)

(56)             References Cited

U.S. PATENT DOCUMENTS 7,694,504  B1      4/2010   Viaud et al.
    8,617,834  B2     12/2013   Rechner
   11,076,274  B1 *   7/2021   Buentello ............ G07C 5/0808
 2006/0020402  A1      1/2006   Bischoff et al.
 2017/0084094  A1 *    3/2017   Worden ............. G01N 29/4454
 2017/0358151  A1 *   12/2017   Koons ..................... G07C 5/08
 2018/0012091  A1 *    1/2018   Ricci ................... G06Q 30/0601
 2018/0137697  A1 *    5/2018   Dudar ................. G07C 5/0808
 2019/0143952  A1 *    5/2019   Hearing ................ B60T 17/221
                                                                340/453
 2020/0064227  A1 *    2/2020   Im ......................... F02D 35/027
 2020/0226851  A1      7/2020   Harmon et al.
 2021/0127540  A1      5/2021   Smith et al.
 2021/0174616  A1 *    6/2021   Yu ......................... G07C 5/008

FOREIGN PATENT DOCUMENTS

EP              1221280  A1    7/2002
    EP              1386534  A1    2/2004
    WO        WO2020023269  A1    1/2020

OTHER PUBLICATIONS

Extended European Search Report and Written Opinion issued in European Patent Application No. 21193683.6, dated Feb. 18, 2022, in 07 pages.

* cited by examiner

SOUND ANALYSIS TO IDENTIFY A DAMAGED COMPONENT IN A WORK MACHINE

FIELD OF THE DISCLOSURE

The present disclosure relates to a work machine, and more particularly to a method and apparatus to identify a damaged component of an agricultural work machine.

BACKGROUND

Work machines are configured to perform a wide variety of tasks for use as construction machines, forestry machines, lawn maintenance machines, as well as on-road machines such as those used to plow snow, spread salt, or machines with towing capability. Additionally, work machines include agricultural machines, such as a tractor or a self-propelled combine-harvester, which include a prime mover that generates power to perform work. In the case of a tractor, for instance, the prime mover is often a diesel engine that generates power from a supply of diesel fuel. The diesel engine drives a transmission which moves wheels or treads to propel the tractor across a field at a designated speed. Tractors often include a power takeoff (PTO) which includes a shaft coupled to the transmission and driven by the engine to power an machine being pulled or pushed through a field by the tractor. Other agricultural work machines include machines pulled by a tractor, for instance, pull type combines, pull type harvesters, seeders, and spreaders. Work machines are also known as work vehicles.

Tractors can be steered through a field by a manual command provided by an operator located in a cab through a manually controlled steering device, such as a steering wheel or joystick, or by an automatic steering command. In the case of an automatic steering command, a steering control signal can be provided by a global positioning system (GPS) signal. Steering control systems often include one or more sensors configured to sense a position of the steering device or a position of the wheels with respect to a frame of the machine.

Harvesting machines, such as hay and foraging machines utilized in the processing of plant material can include mowers, conditioners, flail choppers, windrowers, combines, forage harvesters, and balers for both dry and silage uses. Such harvesting machines are often pulled by the tractor through a field. Self-propelled harvesting machinery is also known.

Historically, tractors and harvesting machines have been driven by an operator. One of the tasks the operator performed was to "listen" to the machine during operation to make sure there are no damaged or broken components on the machine. For example, often times a pickup tine will be bent because it hit an obstruction in the field. Although the harvester unit can still harvest crop, the bent tine can cause additional damage to adjacent components such as tine strippers and cam follower pickup bearings. Replacing the bent tine is a relatively simple low cost affair, however, left unrepaired, this minor failure can result in expensive repairs and extensive down time. Therefore, when the operator identifies a damaged or broken component, the operator typically stops the machine and repairs and/or replaces the damaged component to prevent further damage being done to the machine.

In some work machines, an operator is located in a cab of the machine to either manually control the machine or to monitor machine operation if steering is automated. In these types of machines, the cab can be climate controlled and under those conditions, the sounds of the machine's operation may be muffled or not heard in the confines of the cab. It has also been proposed to remove the operator from the work machine entirely and to control the machine autonomously or remotely without operator intervention at the machine itself. Under these conditions, normally recognized sounds of a properly functioning work machine may not be heard. What is needed, therefore, is a system and apparatus to identify machine sounds and in particular to identify non-standard machine sounds so as to identify damaged, broken, or worn parts, components, or systems.

SUMMARY

In one embodiment, there is provided a method of identifying wear or damage to a part of an agricultural work machine including: identifying a baseline frequency profile of the work machine to determine one or more baseline operating characteristics of the work machine; identifying an operating frequency profile of the work machine to determine one or more working operating characteristics of the work machine; comparing the operating frequency profile of the work machine to the baseline frequency profile of the work machine to provide a comparison profile; and identifying, from the comparison profile, a change to the operating characteristic of the work machine in order to identify wear or damage to a part of the work machine.

In another embodiment, there is provided a work machine control system for an agricultural work machine, wherein the work machine control system includes: i) a sound sensor configured to detect a sound profile of the work machine; ii) an electronic user interface configured to provide status information of the work machine; and iii) a controller. The controller is operatively connected to the sound sensor and to the electronic user interface and includes a processor and a memory. The memory is configured to store program instructions and the processor is configured to execute the stored program instructions to: compare an operating frequency profile of the work machine to a baseline frequency profile to provide a comparison frequency profile; identify, from the comparison frequency profile, a change to the baseline frequency profile; determine whether the identified change to the baseline frequency profile exceeds a predetermined amount; and alter an operation of the agricultural work machine if the identified change exceeds the predetermined amount.

In a further embodiment, there is provided a an agricultural work machine including a work machine control system having a sound sensor located at one of on the work machine or not on the work machine wherein the sound sensor is configured to detect a sound profile of the work machine and an electronic user interface configured to provide status information of the work machine. A controller is operatively connected to the sound sensor and to the electronic user interface. The controller includes a processor and a memory, wherein the memory is configured to store program instructions and the processor is configured to execute the stored program instructions to: identify an operating frequency profile based on the detected sound profile, compare the operating frequency profile of the work machine to a baseline frequency profile to provide a comparison frequency profile; identify, from the comparison frequency profile, a change to the baseline frequency profile; determine whether the identified change to the baseline frequency profile exceeds a predetermined amount; and alter an operation of the agricultural work machine if the identified change exceeds the predetermined amount.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1A:
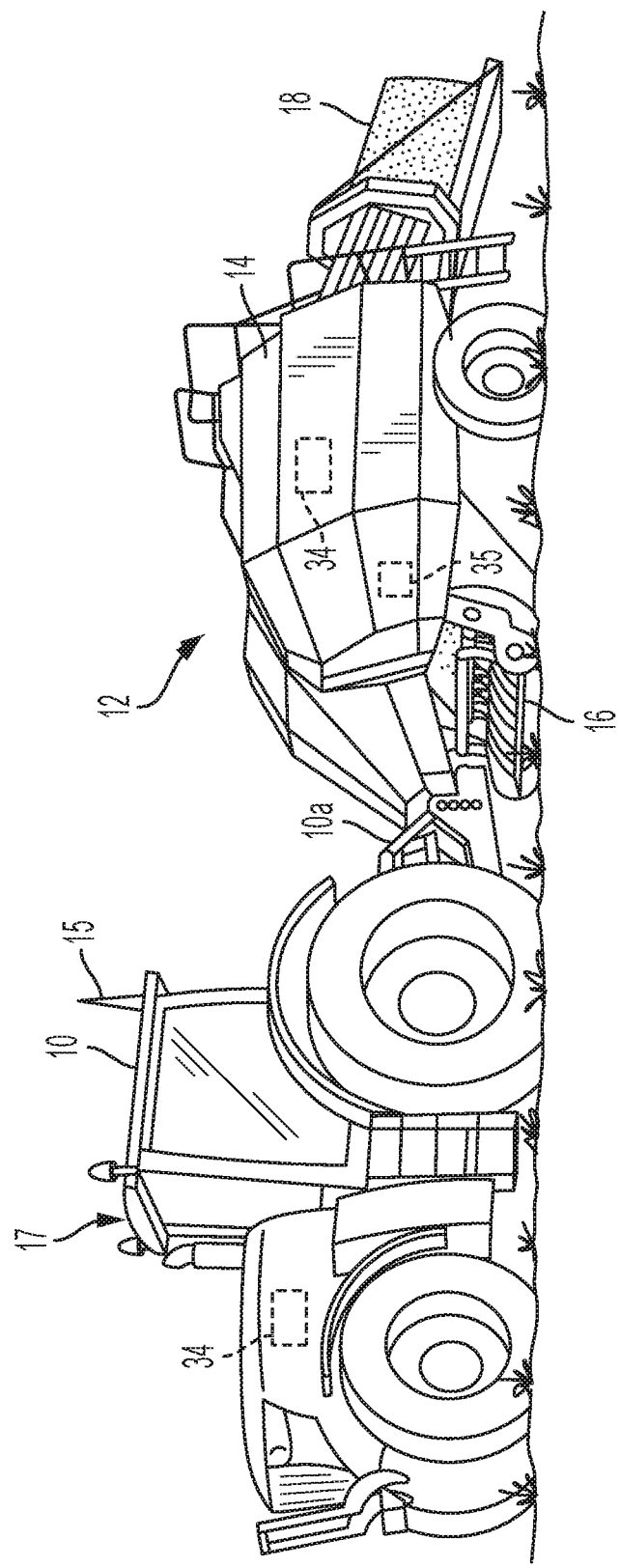
FIG. 1A is a perspective view of an example baler towed by an agricultural machine.

Referring now to FIG. 1A, large square baler 12 may be towed across a field by agricultural machine 10. (It will be understood that various other configurations are also possible. For example, the disclosed systems and methods may be utilized with a variety of balers or other harvesting machines, either puled by a machine or a self-propelled machine.) Baler 12 may include housing 14, which may generally shield various internal components of baler 12. As baler 12 moves across a field (e.g., as towed by machine 10 via connection 10a, such as a PTO) and encounters a windrow or other arrangement of material (not shown), pick-up assembly 16 may gather the material and move it up and into housing 14 for processing. As a result of this processing, as described in greater detail below, bale 18 may be formed and may be ejected from the rear of baler 12. An antenna 15 is located on a cab 17 and is configured to receive and to transmit wireless signals to and from an externally located source of data information, such as is available over the web through a cloud system, or to and from a global positioning system (GPS) which is configured to supply location information machine control information to the controller 34. In different embodiments, for instance, the GPS system directs the machine 10 through the field along a predetermined route to provide for planting, harvesting, plowing, and fertilizing. Other machine functions are contemplated.

In various embodiments, baler 12 (or machine 10) may include one or more computing devices, such as controller 34. Various alternative locations for controller 34 are depicted in FIG. 1A, including locations on machine 10 and baler 12. It will be understood that one or more controllers 34 may be employed and that controller 34 may be mounted at various locations on machine 10, baler 12, or elsewhere. Controller 34 may be a hardware, software, or hardware and software computing device, and may be configured to execute various computational and control functionality with respect to baler 12 (or machine 10). As such, controller 34 may be in electronic or other communication with various components and devices of baler 12 (or tractor 10). For example, controller 34 within baler 12 may be in electronic communication with various actuators, sensors, and other devices within (or outside of) baler 12. Controller 34 may communicate with various other components (including other controllers) in various known ways, including wirelessly.

Figure 1B:
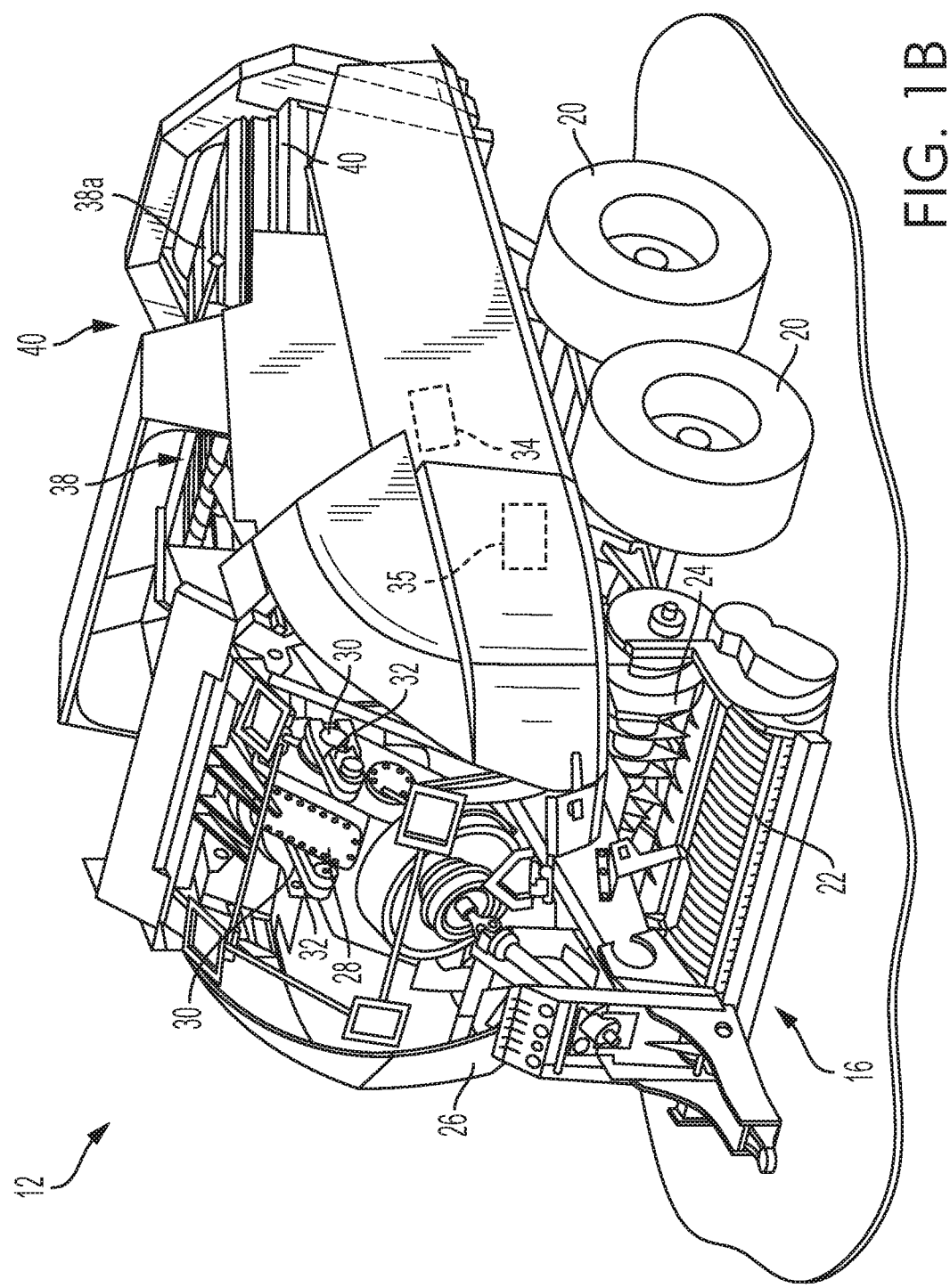
FIG. 1B is a perspective view of the baler of FIG. 1A, with portions of the cover of the baler removed.

Referring to FIG. 1B, various internal components of an example configuration of baler 12 are depicted. It will be understood that various other configurations may also be possible. Pick-up assembly 16, for example, includes rotary tine pick-up 22 for gathering crop material from a windrow (not shown). Material gathered by rotary tine pick-up 22 is routed to feeder 24, which further directs the material toward baling chamber 38 for compaction into a bale. A sound sensor 35 is located within the baler 12 and is configured to convert sound waves generated by the baler 12 into sound signals which are transmitted from the sound sensor 35 to the controller 34. Other locations of the sound sensor 35 are contemplated and are positioned in proximity to one or more components or parts that generate sound during operation of the baler 12. One or more sound sensors are contemplated and are located internally to or at the exterior of the baler 12. In additional embodiments, one or more sound sensors are located on the tractor 10. In different embodiments, the sound sensor includes a microphone, an accelerometer, or other vibration sensing device attached to or located near the harvesting machine or to the work implement, a hand held sensor near the machine, or a mobile sensor whose location can be changed as required.

Baling chamber 38, which is depicted with upper panel 38a in place, may be a chamber of generally rectangular cross section extending axially along baler 12 in a generally front-to-back direction. Chamber 38 may be configured in various ways to receive material gathered by pick-up assembly 16, hold the material for compaction, then release the resulting bale from the back (or other portion) of baler 12 (e.g., as depicted for bale 18, in FIG. 1A).

Baling chamber 38 may be bounded on one or more sides (e.g., to the right and left, from the perspective of the forward direction of baler 12) by tension panels 40, which may be movable in order to control various aspects of a baling operation. For example, various actuators (not shown) may be mounted to baler 12 and one or more of tension panels 40 such that the actuators may cause tension panels 40 to vary the cross-sectional area of baling chamber 38. In certain embodiments, for example, hydraulic pistons (not shown) may be configured to pivot tension panels 40 into (or out of) baling chamber 38, in order to decrease (or increase) the cross-sectional area of chamber 38 and thereby increase (or decrease) the force required to push a given amount of compacted crop material through chamber 38 (e.g., the pressure required for plunger 54 to move the bale through chamber 38). In this way, for example, tension panels 40 may be utilized to vary the density of the resulting bale 18.

Compaction of crop material within baling chamber 38 may be driven in various ways. For example, as depicted in the various figures, a plunger (not shown in FIG. 1B) may be driven by a crank arm assembly. As depicted in FIG. 1B, power take off ("PTO") connection shaft 26 may be configured to receive rotational power from PTO shaft of machine 10 (e.g., via connection 10a, as shown in FIG. 1A). In certain embodiments, accordingly, whenever the PTO output of machine 10 is engaged, PTO connection shaft 26 may be receiving rotational power from machine 10. (It will be understood that various other configurations are also possible, such as configurations in which shaft 26 (or various other components of baler 12) may be selectively disengaged even if the PTO output of machine 10 is engaged.)

In various embodiments, PTO connection shaft 26 provides rotational power to gear box 28. Through one or more internal gears (not shown in FIG. 1B), this power is routed through gear box 28 to crank arms 30, which are connected to plunger 54 via connecting rod(s) 32. Connecting rods 32 have been partially removed in FIG. 1B, for clarity of presentation. In this way, rotational power may be provided from machine 10 to crank arms 30. Crank arms 30, accordingly, then drive the reciprocating motion of the plunger, via connecting rod(s) 32, in order to compact material within baling chamber 38 into formed bales 18. It will be understood that various other configurations are possible. For example, in certain embodiments, gear box 28 is powered by an electrical or hydraulic machine rather than by direct mechanical power from a PTO interface.

In various embodiments, rotation of PTO connection shaft 26 (e.g., as powered by the PTO output of machine 10) additionally (or alternatively) provides rotational power to various components of baler 12. For example, the motion of various components of pick-up assembly 16, various tying mechanisms (not shown), pumps for hydraulic actuation of tension panels 38 (not shown), and so on, are driven via power connections of various known types (e.g., chain or belt drives) to PTO connection shaft 26 or associated components.

A twine tying arrangement (not shown) is provided for wrapping and tying multiple loops of twine about a completed bale. The bale tying cycle, in one embodiment, is initiated by a bale length sensor arrangement (not shown) including a toothed metering wheel (not shown) mounted on a shaft (not shown) extending horizontally across and being rotatably mounted to the top of the baling chamber 38. The metering wheel includes a toothed periphery which extends into the baling chamber 38 and is contacted by a forming bale so as to be rotated as the bale grows in length. The rotation of the metering wheel is sensed and converted into a signal representing bale length, with a control signal being sent to initiate the tying cycle when the forming bale reaches a length corresponding to a desired bale length. An example of a twine tensioner or knotter system is described in U.S. Pat. No. 8,617,834 to Deere & Company, the disclosure of which is hereby incorporated by reference.

While a large square baler is described in FIGS. 1A and 1B, the present disclosure is not limited to large square balers, but includes round balers such as those found in U.S. Pat. Nos. 6,622,468, 6,640,699, 7,694,504, the disclosures of which are incorporated by reference herein. The round baler does not include a compression chamber as does the large square baler. The present disclosure, however, in not limited to a baler of a particular type, and is applicable to balers of different types including those having a precompression chamber, no precompression chamber, secondary rotors, or those having crop moving directly into a formation chamber. The present disclosure is also not limited to balers, but can also include other harvesting machines or crop processing machines such as chopping systems used on combines.

Figure 2:
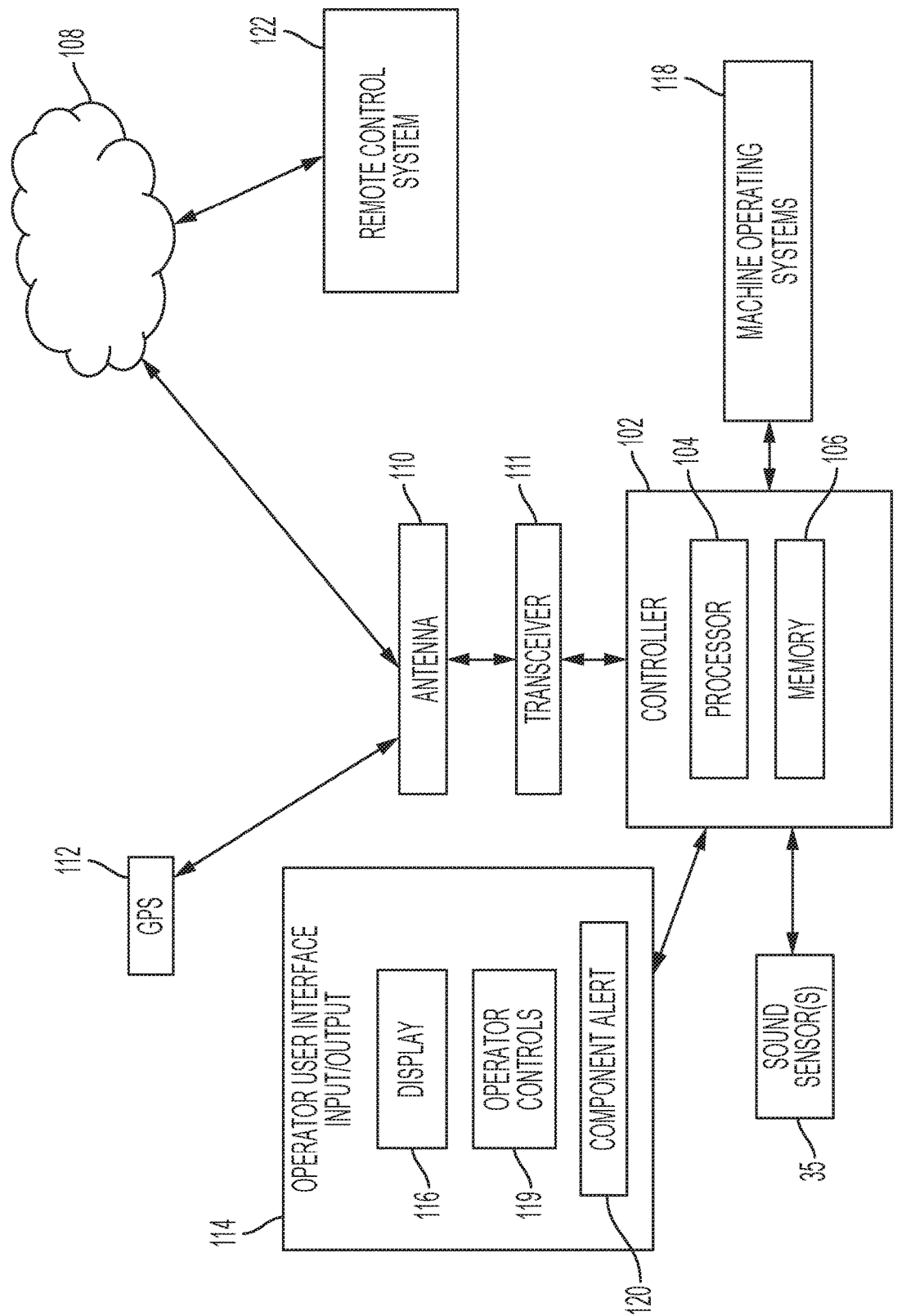
FIG. 2 is a schematic block diagram of a control system configured to determine a malfunction of a component or system of a work machine.

FIG. 2 illustrates a schematic block diagram of a control system 100 configured to determine a component or systems malfunction of the work machine 12 using one or more sound sensors 35. The control system 100 includes one or more electronic controllers 102, also known as an electronic control unit (ECU), each of which is connected to a controller area network (CAN) bus (not shown) and to the various devices and components of the machine 100. The CAN bus is configured to transmit electric signals for the control of various devices connected to the bus as well as to transmit status signals that identify the status of the connected devices.

The controller 102, in different embodiments, includes a computer, computer system, or other programmable devices. In these and other embodiments, the controller 102 includes one or more processors 104 (e.g. microprocessors), and an associated memory 106, which can be internal to the processor or external to the processor. The memory 106 includes, in different embodiments, random access memory (RAM) devices comprising the memory storage of the controller 102, as well as any other types of memory, e.g., cache memories, non-volatile or backup memories, programmable memories, or flash memories, and read-only memories. In addition, the memory can include a memory storage physically located elsewhere from the processing devices, and can include any cache memory in a processing device, as well as any storage capacity used as a virtual memory, e.g., as stored on a mass storage device or another computer coupled to controller 102. The mass storage device can include a cache or other dataspace which can include databases. Memory storage, in other embodiments, is located in a cloud system 108, also known as the "cloud", where the memory is located in the cloud at a distant location from the machine to provide the stored information wirelessly to the controller 102 through an antenna 110 operatively connected to a transceiver 111, which is operatively connected to the controller 102. When referring to the controller 102, the processor 104, and the memory 106, other types of controllers, processors, and memory are contemplated.

The controller 102 executes or otherwise relies upon computer software applications, components, programs, objects, modules, or data structures, etc. Software routines resident in the included memory 106 of the controller 102, or other memory, are executed in response to the signals received from sensors, such as sound sensors 35, as well as signals received from other controllers such as an engine controller and a transmission controller. The controller 102, in other embodiments, also relies on one or more computer software applications, that are located in the "cloud" 108, where the cloud generally refers to a network storing data and/or computer software programs accessed through the internet. The executed software includes one or more specific applications, components, programs, objects, modules or sequences of instructions typically referred to as "program code". The program code includes one or more instructions located in memory and other storage devices which execute the instructions which are resident in memory, which are responsive to other instructions generated by the system, or which are provided at a user interface operated by the user.

The machine 12 includes a plurality of sensors, in addition to the sound sensors 35, each of which in different embodiments, identifies machine device status and transmits sensor information to the controller 102.

A GPS system 112 is wirelessly connected to the antenna 110 and either transmits electrical signals to the controller 102 or receives electrical signals from the controller 102 transmitted by the transceiver 111 using the antenna 110. In the case of an automatic steering command, for instance, a steering control signal can be provided by the global GPS system 112.

An operator user interface 114 is operatively connected to the controller 102 and is located in the cab 17 to display machine information to an operator, located in the cab, as well as to enable the operator to control operations of the tractor 10, the baler 12, or other work machines. The user interface 114 includes a display 116 to display status information directed to the condition or status of the machine 10 as well as the baler 12. Status information includes, but is not limited to, the operating status of a machine operating system 118 including various components, parts, or systems of the baler 12. The user interface 114 further includes operator controls 119 configured to enable the operator to control the various functions and features of the machine operating system 118. A component alert device 120 is located at the user interface 114 and provide an alert function to an operator for alerting the operator in the event of a part or component being found be subject to malfunction.

FIG. 2 illustrates one embodiment of a control system for the tractor 10 and baler 12 wherein the described features are located on either the tractor 10 or the baler 12. For instance, in one embodiment, the sound sensors 35 are located on the baler 35 while the user interface 114 is located in the cab 17 of the tractor. In another embodiment, such as a self-propelled combine, all of the described features are located in the self-propelled combine. Consequently, the machine operating systems 118, in different embodiments, are located on a single machine or on multiple machines as is the case for the tractor 10 and baler 12 of FIG. 1. In addition, the machine operating systems are not limited to agricultural planters, harvesters, or balers, but also include to graders, mowers, grapplers, fellers, and plows. Other machine operating systems are contemplated.

Other work machines are known as autonomous machines are controlled remotely without operator intervention at the machine itself. In such a system, a remote control system 122 is used to remotely control operation of the machine 10 or baler 12 through web-based communication tools and platforms with the cloud 108, as is understood by those skilled in the art. In one embodiment, an operator or manager is located at the remote control system 122, which due to its cloud communication protocol, is located remotely from the machine 10 and the baler 12. In such an embodiment, the control system 100 is a distributed control system having components locate at one or more of the work machines, the cloud, and the remote control system.

In a remotely controlled machine in which the operator is not located at the work machine, or in an operator controlled machine, the control system 100 is configured to identify when a component or system of the machine being monitored has been damaged, through wear or through breakage. One or more of the sound sensors 35 are configured to receive sound generated by the machine and to transmit the received sound to the controller 102. Upon receipt at the controller 102, the sound is analyzed to determine if the received sound includes sound waves that are not typical of a properly operating work machine. In one embodiment, upon determining that the sound is not typical, the operation of the work machine is altered, such as by stopping the machine, and the controller 102 generates a status signal that is transmitted to the remote control system or to the user interface 114 to indicate that a part or component requires an inspection to determine if damage has occurred. Upon receipt of the status signal, the system generates an alert signal to a remote manager located at the remote control system or the user interface that the component may need to be replaced or repaired.

In another embodiment, the controller 102 continuously transmits a signal of the received sound waves to the remote control system or to the controller 102. Once received, the system determines if the received signal indicates a damaged component or system. If a possibility of damage exists, the system alerts the remote manager or operator of the potential damage. Additionally, upon receipt of the received signal, in one embodiment or more embodiments, the remote computing system or controller 102, after determining content of the received data, transmits a signal to stop operation of the machine. In a remotely operated machine, in one embodiment, the machine is directed to a location for maintenance or repair.

To determine the content of the transmitted sound signal received at the controller 102 or at the remote control system 122, a sound analysis is made of the transmitted sound signal to determine a frequency content of the sound in order to identify a feature of the sound signal that indicates a possibility of damage. The sound sensor receives sound waves from the entire machine, in one embodiment, and transmits the received sound waves to the controller. In other embodiments, multiple sensors are located at different locations to target a specific part, component, or system. In one embodiment, a spectrum of frequencies is received at the controller 102 and from the spectrum of frequencies, frequencies of interest are identified and compared to a baseline frequency or frequencies to determine the presence of an anomaly, i.e. a frequency that doesn't match a baseline frequency or frequency amplitude indicating a possible defective part, component, or system. The anomaly indicates that a change to the machine may have occurred and requires attention. The baseline spectrum of frequencies provides a frequency spectrum of operating characteristics of the machine, its components, and systems.

Figures 3A, 3B:
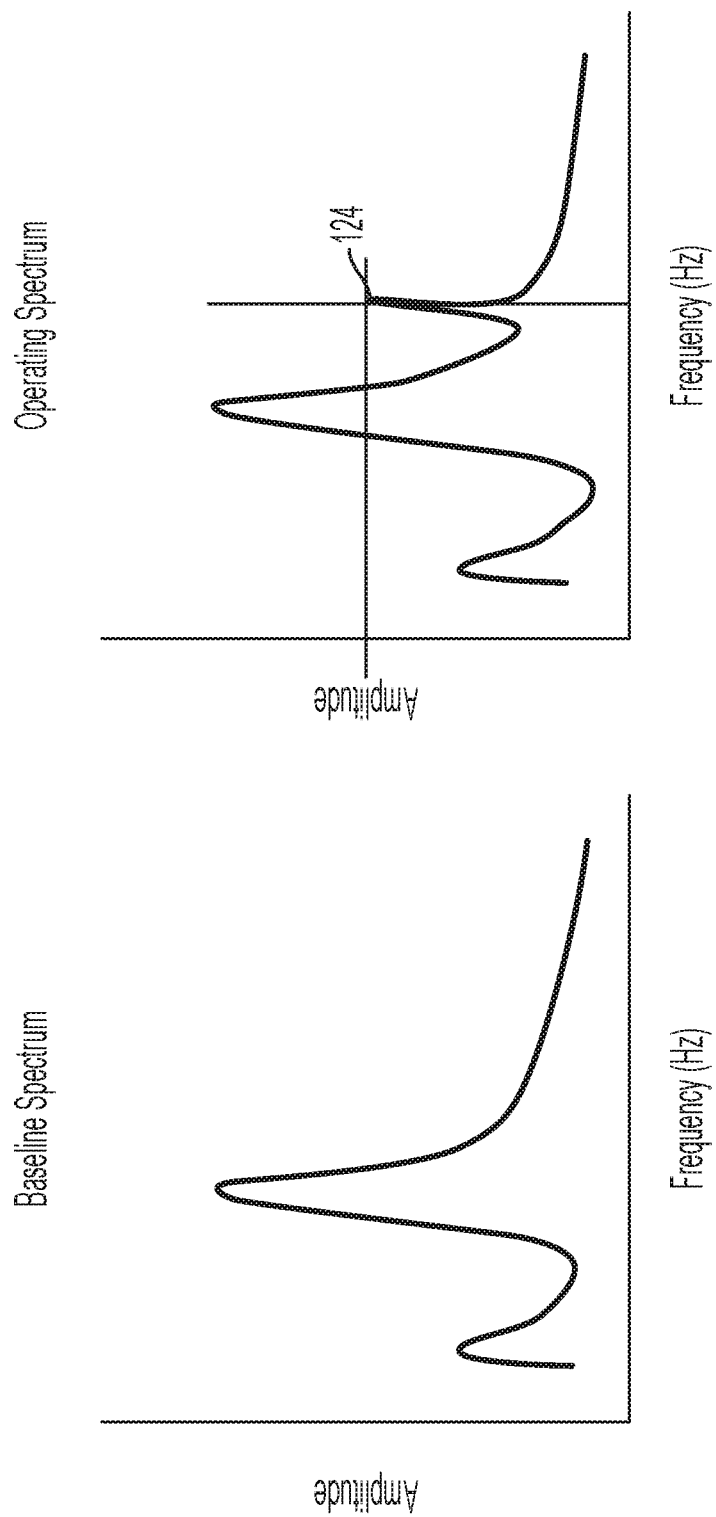
FIGS. 3A and 3B illustrate a baseline frequency spectrum and an operating frequency spectrum of a work machine.

As seen in FIG. 3A, a baseline spectrum of frequencies is illustrated to show a range of frequencies for sound being sensed for an exemplary machine. The baseline spectrum of frequencies is identified when a machine is new and operating according to a design intent of the vehicle. The vehicle is selected as one that is operating according to the design intent and includes a spectrum of frequencies that identify a properly operating work machine. In one embodiment, the baseline spectrum of frequencies is determined based on a single work machine and this baseline spectrum of frequencies is used as the baseline for all other work machines. In another embodiment, each work machine is identified by its own spectrum of frequencies and a universal spectrum of frequencies based on a single work machine is not used. In either situation, a baseline frequency is identified as a baseline frequency profile to distinguish this profile from an operating spectrum profile described below.

Once the machine is put into service, over a period of time the sound spectrum changes, as shown in FIG. 3B. As seen at location 124, a particular frequency of sound has changed and includes a larger amplitude than the same frequency in FIG. 3A. To determine the change, an operating spectrum of frequencies is identified and compared to the baseline spectrum of frequencies to provide a comparison frequency profile. For instance in one embodiment, the baseline spectrum of frequencies is subtracted from the operating spectrum of frequencies to arrive at the change between frequency profiles. In one embodiment, the controller 102, or control system, makes the comparison, identifies the change in amplitude, and sets an alert to indicate that the machine needs to be inspected to determine the source of the anomaly. In other embodiments, an unacceptable change to a component could result in a change in frequency of the sensed sound. For instance, an operating frequency of a part can change over time and this change in frequency indicates that the part is damaged. In other conditions, a change in amplitude and a change in frequency indicates damage to a part.

In one embodiment, the frequencies are identified over a range of operating speeds (i.e. at a range of power take off (PTO) speeds) when the machine is "new" and the new spectrum is identified as a baseline spectrum. In other embodiments, the frequencies are identified at one or more operating speeds of the PTO, but not at the full range of operating speeds. In other embodiments, baseline frequency spectrums are recorded when a machine is new and the machine is stationary. In other embodiments, the baseline frequency spectrums are recorded while running the machine in a field and/or while it is harvesting crop, when new.

In other embodiments, multiple sensors are placed at different locations of the machine wherein each sensor records a spectrum of frequencies for a part, component, or subsystem of the machine. The controller 102 then continuously receives the frequency spectrums while the machine is storing, or comparing in real time, the operating amplitude of each frequency. The magnitude of the received operating frequencies are compared to the magnitude of the baseline frequencies. If the magnitude of one or more of the actual frequencies is different than the baseline magnitude, by more than a predetermined amount, the controller 102, in one embodiment, determines that the change in magnitude beyond the predetermined amount indicates a change to a part or system that may be unacceptable. Once the magnitude is determined to exceed the predetermined amount, the controller notifies a manager at the remote computing system that a component may have failed or has been damaged. In another embodiment, the received operating frequencies are transmitted to the remote computing system 122 and then compared to the baseline frequencies that are either stored in the remote computing system or at the cloud system 108. When the difference between operating frequencies and baseline frequencies exceed the predetermined amount, the machine is shut down for an inspection either in the field or at another location to determine if the change is unacceptable and indicates a worn or damaged part. Depending on the frequency being observed, the vehicle in one embodiment, is directed to a maintenance location in the remotely controlled vehicle.

In another embodiment, each of the frequencies of interest is mapped to a particular component or subsystem. If the controller 102 or the remote control system 122 identifies a frequency that is different from a baseline frequency, it suggests what component or subsystem may be causing the outlier frequency to occur. In one embodiment, each of the baseline frequencies of interest is identified as being associated with a particular component or subsystem and are stored in a lookup table in the memory 106, stored in a memory in the cloud 108, or stored in a memory at the remote control system 122. The controller 102 first makes a comparison between the stored baseline spectrum frequencies and the operating spectrum frequencies to determine if the difference exceeds the predetermined value and if exceeded, the controller 102 identifies the compromised component of subsystem based on the lookup table. In one embodiment a comparison profile is provided to indicate which of the frequencies exceeds the predetermined value. If exceeded, the alert is provided for review by the operator or the manager of the remote control system 122.

As used herein, the "baseline frequency spectrum" refers to a sound profile of the work machine that includes a sound profile when the work machine is newly manufactured. The baseline spectrum frequency also includes frequencies that can change, if an individual part is changed or replaced. For instance, if a muffler is identified as being defective, a replacement muffler replaces the old muffler, and a new baseline is identified to include the frequency spectrum of the replacement muffler. In this situation, the current noise level is compared to the new baseline frequency spectrum, as opposed to being compared to the baseline frequency spectrum of the work machine when new. Consequently, the baseline frequency spectrum can change over time, and is updated as the need arises, as a revised baseline spectrum, such as when an old part is replaced with a new part.

In some conditions, when the alert is generated for review by the operator, the operator can decide that the change in the baseline frequency spectrum is not sufficient to require a maintenance review at the time the alert sounds. To provide this feature, operator controls 119 include a user selectable button or other device that when selected resets the baseline frequency spectrum to an updated frequency spectrum based on the current frequency spectrum that has caused the alert. In another embodiment, the operator controls 119 includes a baseline adjustment feature which permits the operator to alter, to increase, or to update, the baseline value that has caused the alert. In one embodiment, the operator controls 119 include a feature that enables the operator to change a threshold value, which if exceeded by the current baseline frequency spectrum, is used to provide an alert.

The updated value is then used as the new baseline value. Consequently, identifying the baseline includes identifying an initial baseline when the machine is new, identifying a different or updated baseline when a part or component is repaired or replaced, or identifying an updated baseline, based on identification of an updated baseline by the operator. Other types of updates are contemplated.

While a baler has been described with respect to using a frequency spectrum for the identification of worn or damaged components or systems, other agricultural machines are contemplated, each of which performs one or more operations used in the agricultural industry for preparing land and the planting and cultivation of crops. Each of the agricultural machines performs one or more operations and includes a variety of parts, components, devices, and subsystems directed to the performance of one or more operations. As each of these machines performs an operation, sounds are generated by the machine which include identifiable sound characteristics, i.e. frequencies. A change in frequencies from a baseline spectrum to an operating spectrum is used to identify abnormal operations. Consequently, agricultural machines are not limited to the baler as described herein, but include other agricultural machines that provide a variety of operations, including but not limited to: reaping, gathering, threshing, cleaning, hauling, stacking, piling, plowing, bagging, and wrapping. In addition, the present disclosure is applicable to other types of work machines including include to graders, mowers, grapplers, fellers, and plows, each of which include part, components, and subsystems configured to perform a work operation or function.

Alternate embodiments of the control system include the sound sensor being located at a variety of different locations. For instance, in different embodiments the sound sensor is mounted directly to the work machine. Such work machines include, but are not limited to a harvesting unit such as a baler towed behind a tractor, or a self-propelled work machine. In another embodiment, a hand-held or mobile sound sensor includes the use of the sound sensing device held or operated by a technician, but not mounted directly on the work machine. For instance, the technician could use the sound sensing device as part of a regularly scheduled maintenance check to determine if a component, such as a bearing, has been damaged or has failed during use. In one embodiment, the hand-held device includes a cell phone or mobile telephone having an application (app) configured to identify machine failure or malfunction. A dedicated hand-held device is also contemplated. In a further embodiment, the sound sensor is mounted on a tractor in which the sound sensor is directed toward the work machine. The tractor sensor "listens" to the work machine and determines if the "sound spectrum" of the work machine has changed sufficiently to indicate that the work machine requires maintenance or repair. In another embodiment, the sound sensor listens to the tractor, or both the tractor and the work machine.

While embodiments incorporating the principles of the present disclosure have been disclosed hereinabove, the present disclosure is not limited to the disclosed embodiments. Consequently, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method of identifying wear or damage to a part of an agricultural work machine, the method comprising:
    identifying a baseline frequency profile of the agricultural work machine when newly manufactured and operating to design intent or when a part or component of the agricultural work machine is repaired or replaced to determine one or more baseline operating characteristics of the agricultural work machine;
    identifying an operating frequency profile of the agricultural work machine once put into service to determine one or more working operating characteristics of the agricultural work machine;
    comparing the operating frequency profile of the agricultural work machine to the baseline frequency profile of the agricultural work machine to provide a comparison profile; and
    identifying, from the comparison profile, a change to the operating characteristic of the agricultural work machine once put into service in order to identify wear or damage to a part of the agricultural work machine.

2. The method of claim 1 wherein the identifying a baseline frequency profile includes identifying the baseline frequency profile with at least one audio sensor located on the agricultural work machine.

3. The method of claim 1 wherein the identifying an operating frequency profile includes identifying the operating frequency profile with the at least one audio sensor located at one of on the agricultural work machine or not on the agricultural work machine.

4. The method of claim 3 wherein the baseline frequency profile includes one or more frequencies and the change includes identifying a change between the baseline frequency profile and the operating frequency profile.

5. The method of claim 4 wherein the change includes a change in a magnitude of one of the frequencies of the baseline frequency profile.

6. The method of claim 4 wherein the change includes a change in a frequency rate of one of the frequencies of the baseline frequency profile.

7. A work machine control system for an work machine, the work machine control system comprising:
    a sound sensor configured to detect a sound profile of the work machine;
    an electronic user interface configured to provide status information of the work machine; and
    a controller operatively connected to the sound sensor and to the electronic user interface, the controller including a processor and a memory, wherein the memory is configured to store program instructions and the processor is configured to execute the stored program instructions to:
        identify an operating frequency profile of the work machine once placed into service based on the detected sound profile;
        compare the operating frequency profile of the work machine to a baseline frequency profile of the work machine, the baseline frequency profile determined when operating to design intent or when a part or component of the work machine is repaired or replaced, to provide a comparison frequency profile;
        identify, from the comparison frequency profile, a change to the baseline frequency profile;
        determine whether the identified change to the baseline frequency profile exceeds a predetermined amount; and
        alter an operation of the work machine if the identified change exceeds the predetermined amount.

8. The work machine control system of claim 7 wherein the altered operation of the work machine is one of stopping the work vehicle or displaying an alert on a user interface.

9. The work machine control system of claim 8 wherein the processor is further configured to execute stored program instructions to:
    identify the operating sound frequency profile of the work machine from the detected sound profile of the work machine during a work operation of the work machine.

10. The work machine control system of claim 9 wherein the processor is further configured to execute stored program instructions to:
    identify the baseline sound frequency profile of the work machine from the detected sound profile of the work machine during a baseline operation of the work machine, wherein the baseline sound frequency profile includes one or more frequencies.

11. The work machine control system of claim 10 wherein the identified change to the baseline frequency profile includes a change in a magnitude of one of the frequencies of the baseline frequency profile.

12. The work machine control system of claim 10 wherein the identified change to the baseline frequency profile includes a change in a frequency rate of one of the frequencies of the baseline frequency profile.

13. The work machine control system of claim 10 wherein the memory is configured to store a database based on the baseline frequency profile, wherein the database includes a plurality of baseline frequencies each one of the baseline frequencies being associated with a particular component or subsystem of the work machine.

14. The work machine control system of claim 13 wherein the processor is further configured to execute stored program instructions to:

compare the identified change to the baseline frequency profile to the database to identify one or more component or subsystems having the change exceeding the predetermined amount.

15. The work machine control system of claim 10 wherein the controller is located in a remote computing system.

16. The work machine control system of claim 15 wherein the remote computing system is a cloud based system.

17. An agricultural work machine comprising:
an agricultural work machine control system including a sound sensor located at one of on the agricultural work machine or not on the agricultural work machine, the sound sensor configured to detect a sound profile of the agricultural work machine, an electronic user interface configured to provide status information of the agricultural work machine, and a controller operatively connected to the sound sensor and to the electronic user interface, the controller including a processor and a memory, wherein the memory is configured to store program instructions and the processor is configured to execute the stored program instructions to:
identify an operating frequency profile of the agricultural work machine once put into service based on the detected sound profile;
compare the operating frequency profile of the agricultural work machine to a baseline frequency profile of the agricultural work machine, the baseline frequency profile determined when operating to design intent or when a part or component of the agricultural work machine is repaired or replaced to provide a comparison frequency profile, wherein the baseline frequency profile includes one or more frequencies;
identify, from the comparison frequency profile, a change to the baseline frequency profile;
determine whether the identified change to the baseline frequency profile exceeds a predetermined amount; and
alter an operation of the agricultural work machine if the identified change exceeds the predetermined amount.

18. The agricultural work machine of claim 17 wherein the altered operation of the agricultural work machine is one of stopping the agricultural work machine or displaying an alert on a user interface.

19. The agricultural work machine of claim 18 wherein the processor is further configured to execute stored program instructions to:
identify the operating frequency profile of the agricultural work machine once put into service from a detected sound profile of the work machine during a work operation of the agricultural work machine.

20. The agricultural work machine of claim 19 wherein the processor is further configured to execute stored program instructions to:
identify the baseline frequency profile of the agricultural work machine when operating to design intent from a detected sound profile of the work machine during a baseline operation of the agricultural work machine, wherein the identified change to the baseline frequency profile includes one of: i) a change in a magnitude of one of the frequencies of the baseline frequency profile; or ii) a change in a frequency rate of one of the frequencies of the base line frequency profile.

* * * * *